Figure 3:
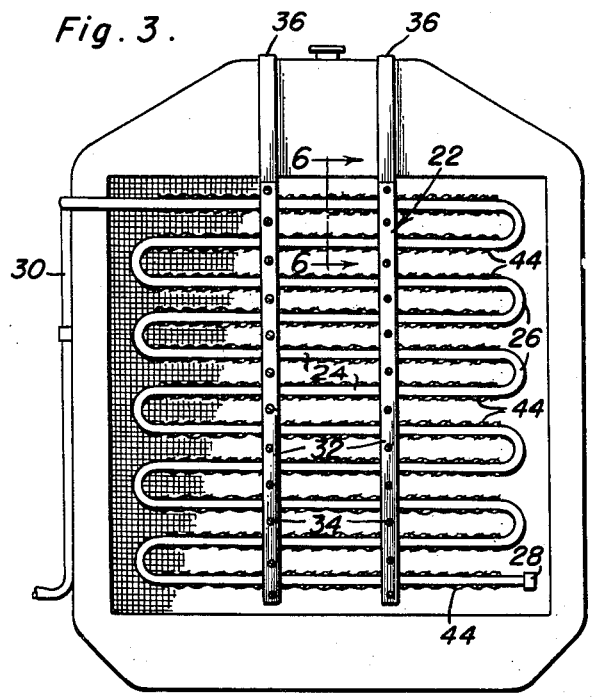

July 4, 1950 — A. PARTIN — 2,514,253
VEHICLE COOLING SYSTEM ATTACHMENT
Filed Nov. 4, 1948 — 2 Sheets-Sheet 1
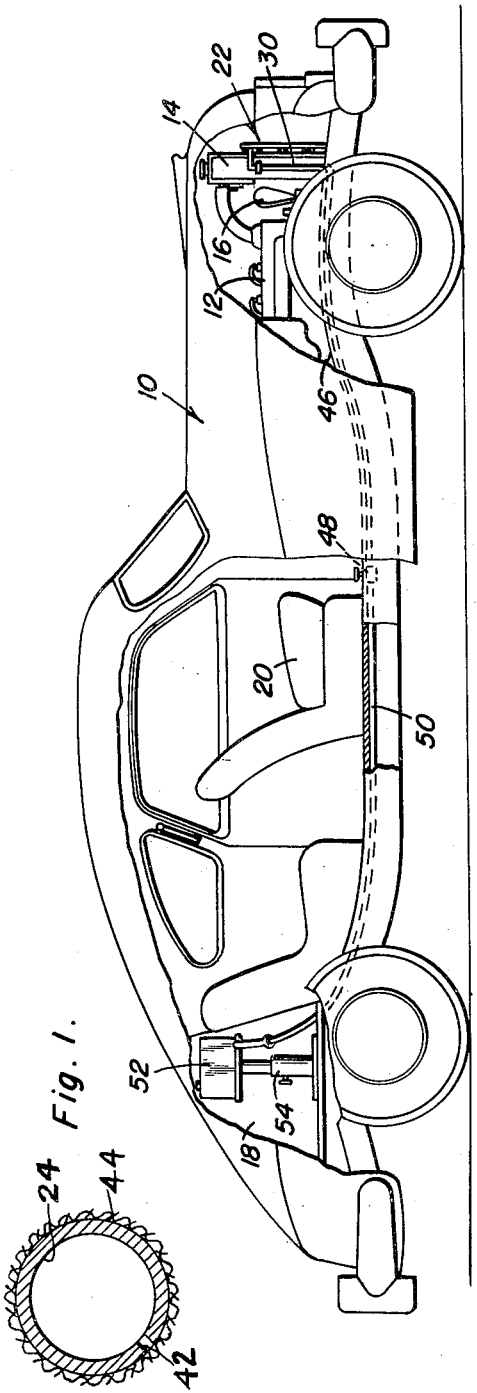
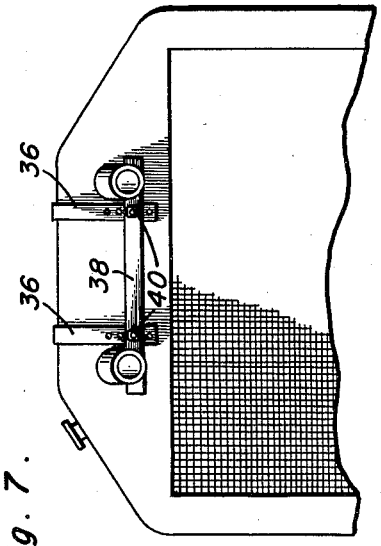
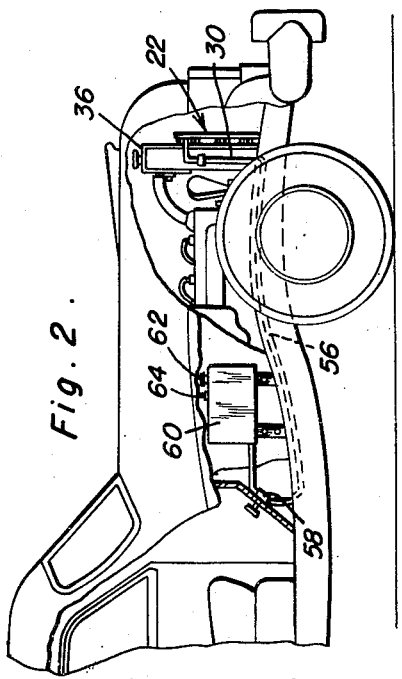
Albert Partin
INVENTOR.

July 4, 1950  A. PARTIN  2,514,253
VEHICLE COOLING SYSTEM ATTACHMENT
Filed Nov. 4, 1948  2 Sheets-Sheet 2

Albert Partin
INVENTOR.

Patented July 4, 1950

2,514,253

UNITED STATES PATENT OFFICE 2,514,253

VEHICLE COOLING SYSTEM ATTACHMENT

Albert Partin, Amarillo, Tex.

Application November 4, 1948, Serial No. 58,183

4 Claims. (Cl. 123—170)

This invention relates to the cooling system of a conventional motor vehicle, and more particularly to an attachment for aiding in maintaining the radiator and engine of a motor vehicle properly cooled.

In tropical climates where temperatures frequently attain values beyond which automotive engines lose their efficiency or fail to function, considerable difficulty is experienced in achieving the proper cooling of the engine and cooling system.

The primary purpose of this invention is to assist in maintaining the engine temperatures at a value which will allow the engine properly to function irrespective of the temperature of the surrounding atmosphere.

Another object of the invention is to enable the ordinary cooling system of the vehicle to maintain the desired engine temperature.

The above and other objects may be attained by employing this invention which embodies among its features a group of spray pipes mounted in front of the radiator of a conventional automotive engine, said pipes having water discharge orifices therein which are directed toward the radiator and means carried by the vehicle to supply water under pressure to the spray pipes and cause said water to be discharged through the orifices and into the air drawn through the radiator by the ordinary fan which is generally interposed between the radiator and the engine.

Other features include supporting bars carried by the spray pipes and hooks on the supporting bars detachably to engage the radiator and hold the auxiliary cooling means in place thereagainst.

Figure 4:
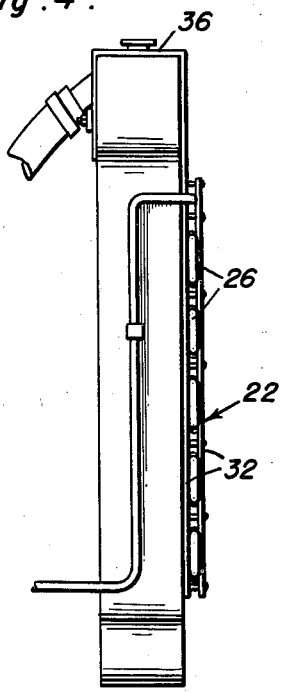
Figure 5:
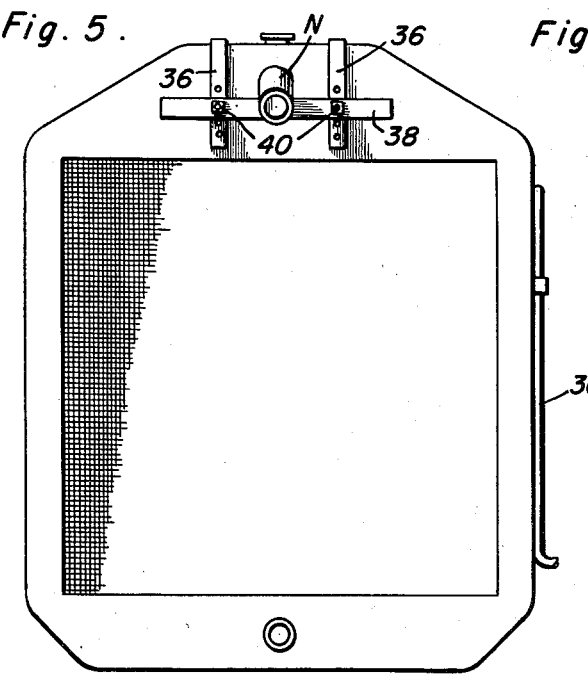
Figure 6:
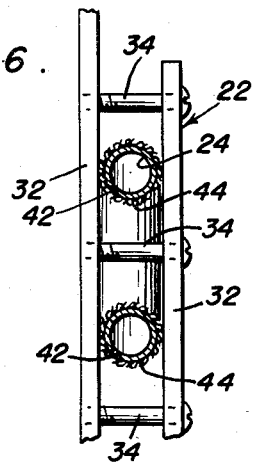

In the drawings:

Figure 1 is a diagrammatic side view of a motor vehicle illustrating one method of installation of this improved vehicle cooling system attachment, Figure 2 is a fragmentary side view of a vehicle illustrating the modified form of installation, Figure 3 is a front view in elevation of a conventional radiator showing this attachment supported thereon, Figure 4 is an edge view of the radiator illustrated in Figure 3, Figure 5 is a rear view in elevation of the radiator illustrated in Figure 3 with the attachment in place thereon, Figure 6 is an enlarged fragmentary sectional view taken substantially along the line 6—6 of Figure 3, Figure 7 is a fragmentary rear view of a different style radiator showing this attachment in place thereon; and Figure 8 is an enlarged sectional detail of one element of the present invention.

Referring to the drawings in detail a conventional motor vehicle designated generally 10 is equipped with a conventional motor 12 which is cooled by a conventional radiator 14, and mounted between the motor and radiator, and driven by the motor 12 is a conventional cooling fan 16. The vehicle 10 is equipped with a conventional compartment or trunk 18 and the usual driver's seat 20.

My improved cooling system attachment comprises a radiator cooler designated generally 22 which embodies a group of spray pipes 24 opposite ends of which are joined by U-bends 26 to form a grill which is adapted to be supported in front of the radiator as suggested in Figures 1 and 2. In actual construction the spray pipes 24, and U-bends 26 are formed of one piece of tubing, one end of which is closed by a suitable cap 28, while the opposite end has coupled thereto a feed pipe 30. In the preferred form of the invention the feed pipe 30 leads into the uppermost spray pipe 24, while the cap 28 closes the lowermost spray pipe as will be readily understood upon reference to Figure 3. As shown in the drawings the pipes 24 are held in spaced parallel relation by spaced parallel clamp bars 32 which are coupled by suitable rivets or bolts 34 which extend between the pipes 24 and serve to clamp the pipes between the clamp bars 32. As will be readily understood upon reference to the drawings there are two pairs of clamp bars 32 arranged in spaced parallel relation transversely of the pipes 24 and one of each pair of clamp bars extends upwardly beyond the opposite clamp bar of its respective pair and is bent horizontally and then downwardly to form a hook 36 which forms a suspension means by which the unit 22 is supported on the radiator of the vehicle. A cross bar 38 is adjustably coupled by means of bolts 40 to each pair of hooks 36, and extends below the uppermost nipple N of the radiator as will be readily understood upon reference to Figure 5.

As illustrated in Figure 6 each spray pipe 24 is provided with a longitudinal row of orifices 42 which are directed rearwardly and downwardly toward the radiator upon which the device is suspended so that water flowing through the pipes 24 will be directed through the radiator and into the path of movement of the air therethrough. In the preferred form of the invention each spray pipe 24 is encased in a tubular body of fabric 44 such as gauze in order that the water issuing through the orifices 42 may be finely divided before it enters the air stream flowing through the radiator.

In the form of the invention illustrated in Figure 1, the end of the pipe 30 opposite that which leads to a spray pipe 24 has coupled thereto a flexible conduit 46 which leads rearwardly of the vehicle to one end of a control valve 48 which is preferably located within easy reach of the occupant of the seat 20. This valve 48 is coupled by means of a supply pipe 50 to a reservoir 52 which as illustrated in Figure 1 is supported on a vertically adjustable stand 54 within the trunk 18, so that when the reservoir 52 is filled with water, the water may be made to flow by gravity through the pipe 50, valve 48 and flexible conduit 46 into the spray pipes 24, with sufficient force to cause it to be ejected from the spray pipes 54 through the orifices 42. By regulating the valve 48, the volume of flow may be easily controlled in order properly to aid in the cooling of the engine 12.

In the modified form of the invention illustrated in Figure 2, the pipe 30 has connected thereto a flexible conduit 56 which leads through a valve 58 preferably located near the seat of the operator of the vehicle to a reservoir 60 which is preferably supported beneath one of the forward fenders of the vehicle. This reservoir is equipped with a conventional filling opening which is closed by a cap 62 to form an air tight seal, and entering the top of the reservoir 60 is a conventional air valve 64 by which air may be introduced into the reservoir on top of the water contained therein so that when the valve 58 is opened, the water will be forced under air pressure into the spray pipes 24.

In employing the device in conjunction with a radiator equipped with dual water inlet openings, the pairs of bars 32 may be adjusted inwardly so that the hooks 36 may escape the inlet nipples of the radiator, and yet permit the bar 38 to engage the bottoms of the nipples in order securely to sustain the radiator cooler in place.

In use when it is desired to employ the radiator cooler, one or the other of the supply tanks 52 or 60 is filled with water, and where the gravity feed is employed the water will flow through the pipe 50 and valve 48 from whence it is directed through the flexible conduit 46 into the pipes 24. When the pressure feed is to be employed, the tank 60 is filled with water and the cap 62 securely mounted to close the water filling opening, after which air pressure is introduced into the tank 60 through the valve 64, and upon opening the valve 58, the water will flow through the conduit 56 to the pipe 30 and thence will be distributed by the pipes 24 and orifices 42 into the air flowing through the radiator under the influence of the fan 16.

While in the foregoing there has been shown and described the preferred embodiment of this invention it is be understood that minor changes in the details of construction, combination and arrangement of parts may be resorted to without departing from the spirit and scope of the invention as claimed.

Having described the invention, what is claimed as new is:

1. In a motor vehicle engine cooling system of the type which includes an engine having a water jacket, a radiator mounted adjacent the engine through which water from the water jacket of the engine circulates and a fan between the engine and the radiator for drawing air through the radiator and directing it over the engine, auxiliary cooling means for the engine comprising a group of spray pipes mounted in front of the radiator, said pipes having water discharge orifices therein which are directed toward the radiator, means carried by the vehicle to supply water under pressure to the spray pipes and cause it to be discharged through the orifices and into the air drawn through the radiator by the fan, supporting bars carried by the spray pipes and hooks on the supporting bars detachably to engage the radiator and hold the auxiliary cooling means in place thereagainst.

2. In a motor vehicle engine cooling system of the type which includes an engine having a water jacket, a radiator mounted adjacent the engine through which water from the water jacket of the engine circulates and a fan between the engine and the radiator for drawing air through the radiator and directing it over the engine, auxiliary cooling means for the engine comprising a group of spray pipes mounted in front of the radiator, said pipes having water discharge orifices therein which are directed toward the radiator and a water reservoir mounted on the vehicle and connected to the spray pipes to supply water under pressure to said spray pipes and cause it to be discharged through the orifices and into the air drawn through the radiator.

3. In a motor vehicle engine cooling system of the type which includes an engine having a water jacket, a radiator mounted adjacent the engine through which water from the water jacket of the engine circulates and a fan between the engine and the radiator for drawing air through the radiator and directing it over the engine, auxiliary cooling means for the engine comprising a group of spray pipes mounted in front of the radiator, said pipes having water discharge orifices therein which are directed toward the radiator, means carried by the vehicle to supply water under pressure to the spray pipes and cause it to be discharged through the orifices and into the air drawn through the radiator by the fan and a valve between the source of water supply and the group of spray pipes to regulate the flow of water thereto.

4. In a motor vehicle engine cooling system of the type which includes an engine having a water jacket, a radiator mounted adjacent the engine through which water from the water jacket of the engine circulates and a fan between the engine and the radiator for drawing air through the radiator and directing it over the engine, auxiliary cooling means for the engine comprising a group of spray pipes mounted in front of the radiator, said pipes having water discharge orifices therein which are directed toward the radiator, a water reservoir mounted on the vehicle and connected to the spray pipes to supply water under pressure to said spray pipes and cause it to be discharged through the orifices and into the air drawn through the radiator and a valve carried by the vehicle within easy reach of the operator, said valve being connected to the reservoir and the group of spray pipes to regulate the rate at which water is discharged through the orifices.

ALBERT PARTIN.

REFERENCES CITED

The following references are of record in the file of this patent:

UNITED STATES PATENTS

| Number | Name | Date |
|---|---|---|
| 729,070 | Hornbrook | May 26, 1903 |
| 737,104 | Hornbrook | Aug. 25, 1903 |
| 971,328 | Vaughn | Sept. 27, 1910 |
| 2,278,242 | Chapman | Mar. 31, 1942 |
| 2,445,199 | Williams | July 13, 1948 |

FOREIGN PATENTS

| Number | Country | Date |
|---|---|---|
| 853,829 | France | 1939 |